Dec. 23, 1930.  G. W. ELSEY  1,785,893
REBOUND CHECK
Filed April 2, 1926

Inventor
George W. Elsey
By Spencer Swall & Hardman
his Attorneys

Patented Dec. 23, 1930

1,785,893

UNITED STATES PATENT OFFICE

GEORGE W. ELSEY, OF ANDERSON, INDIANA, ASSIGNOR, BY MESNE ASSIGNMENTS, TO DELCO PRODUCTS CORPORATION, OF DAYTON, OHIO, A CORPORATION OF DELAWARE

REBOUND CHECK

Application filed April 2, 1926. Serial No. 99,371.

This invention relates to rebound checks for automobiles and other vehicles which have a frame or body supported by springs upon the road wheel axles.

One of the objects of the invention is to simplify the construction of vehicle rebound checks in order to reduce the cost of manufacture.

Further objects and advantages of the present invention will be apparent from the following description, reference being had to the accompanying drawings, wherein a preferred form of embodiment of the present invention is clearly shown.

Figures 1, 2, 3:
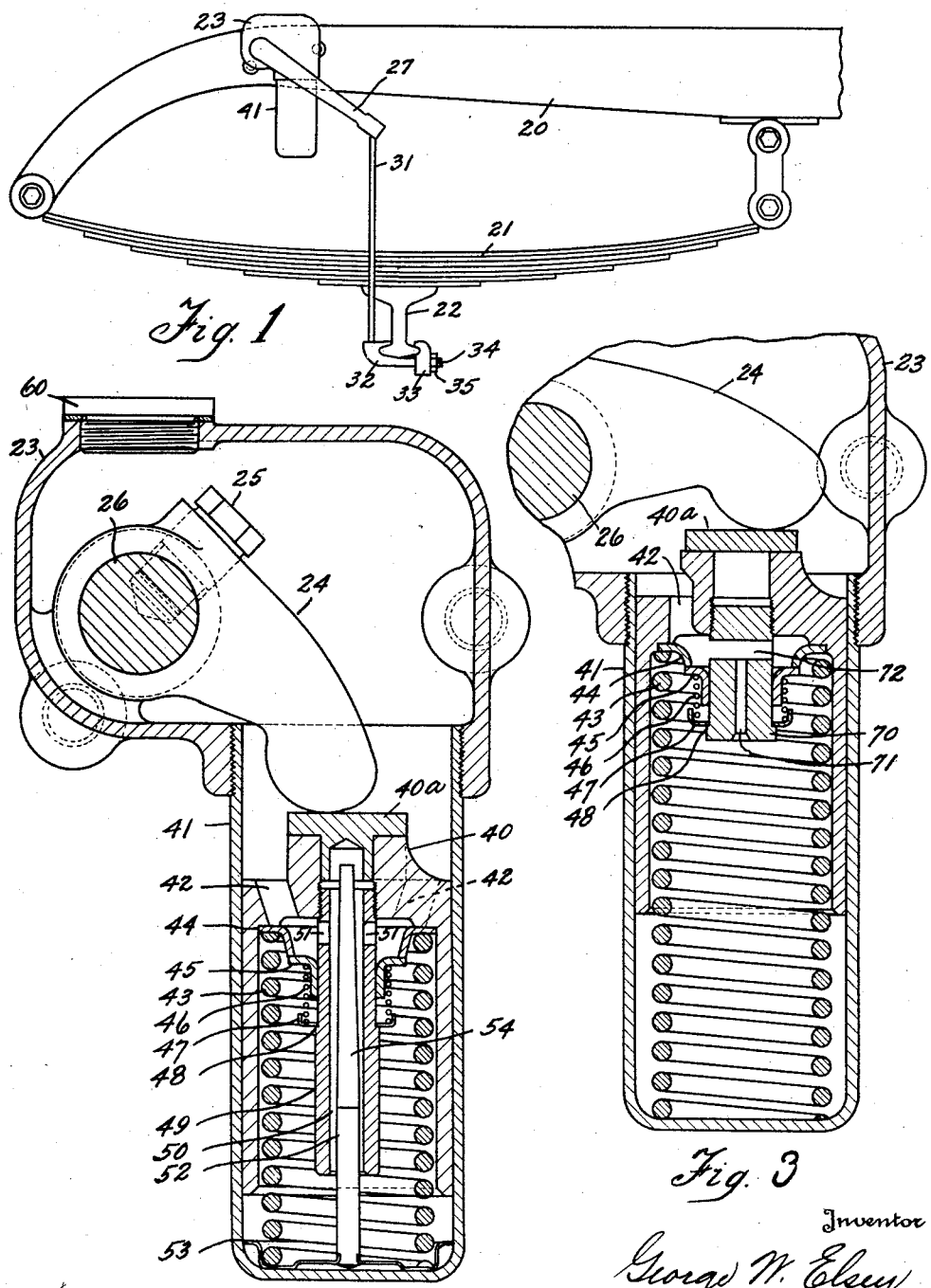
Fig. 1 is a diagrammatic fragmentary side view showing the vehicle frame and axle and a form of the present invention applied thereto.
Fig. 2 is a longitudinal sectional view of the rebound check.
Fig. 3 is a view similar to Fig. 2 showing a modified form of the invention.

Referring to Fig. 1, 20 designates the frame member of a vehicle which is supported by springs, one of which is shown at 21 upon an axle 22 to which the road wheels are connected. The rebound check includes a bracket 23 which is attached in any suitable manner either to the axle member or to the frame member and preferably to the latter. The bracket 23 supports and provides a housing for an oscillatable part or lever 24 which is attached by screw 25 to a shaft 26. One end of the shaft 26 projects through a side wall of the bracket 23 and is connected with a lever 27. The lever 27 is swivelly connected with a cable 31 having its lower end attached to a clamp bolt 32 which passes through a clamping washer 33 and has a threaded end 34 cooperating with a nut 35. When the nut 35 is tightened the clamping members 32 and 33 will securely embrace the lower flange of the axle 22.

The separation of the frame 20 from the axle 22, due to the rebound of the vehicle, is checked or retarded by apparatus which coacts with the oscillatable member or lever 24. This apparatus includes a piston 40 which is slidable within a liquid receiving cylinder 41 attached to the bracket 23. The piston 40 is provided with a wear piece 40a engageable with the lever 24, and with apertures 42 therethrough. Obviously downward movement of the piston is produced by the clockwise rotation of the lever 24 as viewed in the drawings, and upward movement of the piston is produced by spring 43 bearing at its lower end against the bottom wall of the cylinder 41 and bearing at its upper end against an annular valve seat member 44 which is located adjacent the passage 42. An annular valve member 45 cooperates with the valve seat 44 and is urged toward the closed position by a spring 46 bearing at its upper end against the valve 45 and its lower end against a cup-shaped washer 47. Downward movement of the washer 47 is restrained by engagement of the washer with an annular shoulder 48 which is provided by a tube 49 located axially of the piston and having its upper end threaded into the head of the piston. The central passage 50 of the tube 49 is connected by side openings 51 with the space surrounded by the valve seat 44. In this manner the tube 49 provides a by-pass around the check valve member 45. The tube 49 also provides a guide for the valve member 45.

A suitable rebound retarding liquid is poured through an opening which is closed by a plug 60.

The flow of liquid through the passage 50 is controlled by metering pin 52 which extends through the tube 49 and is attached at its lower end to a disc 53 which is maintained against the end wall of the cylinder 41 by the spring 43. The disc 53 maintains the lower end of the spring 43 centrally of the cylinder.

It will be noted that the metering pin is not uniform in diameter but that its cross sectional dimensions are variable. This feature is present for the purpose of variably restricting the passage of liquid through the metering orifice 50 in order that the checking action will vary for different positions of the vehicle with respect to the axle. Figs. 1 and 2 show the rebound checking apparatus in position taken by it when the vehicle frame is at the maximum distance from the axles. The pin 52 includes a conical tapering portion 54. Therefore the rebound snubbing action will be gradually increased as the distance of rebound increases since the cross sectional area of the passage between the pin 52 and the tube 49 will gradually decrease. The invention is not limited to the use of the tapered metering pin shown, but other pins having different longitudinal sectional contours may be substituted for the one shown in order to produce a checking action suited to the particular vehicle to which the rebound check is attached.

In order to reduce the noise produced by the flow of liquid through the metering passage, the tube 49 has a smooth central passage of substantially uniform diameter and the wall of the tube is relatively thick. The annular passage between the pin and the interior surface of the tube is one which gradually increases in cross sectional dimensions so that there is no sudden change in velocity of the liquid as it is forced through the metering passage. Since the change in velocity is very gradual, the liquid will not surge or swirl or pound the sides of the metering tube to an extent such as to produce noise. Furthermore, there is less tendency for a thick-walled tube to vibrate to an extent sufficient to produce objectionable sound.

For some vehicles, a rebound check having a variable action is not necessary, therefore the metering pin may be omitted. Fig. 3 shows a form of the invention which includes a tube 70 having passages 71 and 72 providing a by-pass of the check valve. The passage 71 determines the flow of liquid through the by-pass in order to produce the desired rebound checking effect. Obviously, the invention is not limited to the particular tube 71 shown, but tubes provided with metering passages having different dimensions may be used without requiring further modification of the structure.

While the form of embodiment of the present invention as herein disclosed, constitutes a preferred form, it is to be understood, that other forms might be adopted, all coming within the scope of the claims which follow.

What is claimed is as follows:

1. A rebound check for controlling the movement of two relatively movable members, comprising in combination, a casing providing a fluid reservoir, secured to one of said members; an oscillatable part supported by said casing; means for connecting said part to the other of said members; a closed end cylinder attached to the casing and communicating therewith; a piston in the cylinder, adapted to be operated in the one direction by the oscillatable part, said piston having a fluid passage in its head portion providing communication between the interior of the cylinder and the casing; a valve in the piston providing for the substantially free flow of fluid through the piston head passage when the piston is moved away from the closed end of the cylinder; a mounting disc on the bottom of the cylinder; means comprising cooperating members carried by the piston and mounting disc respectively, providing for the restricted flow of fluid through the piston head passage when the piston is moved toward the closed end of the cylinder; and a spring engaging the mounting disc and valve in the piston for maintaining them in their respective positions and for moving the piston away from the closed end of the cylinder.

2. A rebound check for controlling the movement of two relatively movable members, comprising in combination, a casing providing a fluid reservoir, secured to one of said members; an oscillatable part supported by said casing; means for connecting said part to the other of said members; a closed end cylinder attached to the casing and communicating therewith; a piston in the cylinder, adapted to be operated in the one direction by the oscillatable part, said piston having a fluid passage in its head portion providing communication between the interior of the cylinder and the casing; a valve in the piston providing for the substantially free flow of fluid through the piston head passage when the piston is moved away from the closed end of the cylinder; a fluid conduit carried by the piston head for by-passing fluid around the check valve when the piston is moved toward the closed end of the cylinder; a mounting disc in the cylinder engaging the closed end thereof, said mounting disc carrying a metering pin which extends coaxially into the fluid conduit; and a spring interposed between the valve in the piston and the mounting disc, for maintaining said valve and disc in their proper positions on the piston and cylinder end respectively, said spring being adapted to move the piston in the direction away from the closed end of the cylinder.

3. A shock absorber comprising, in combination, a casing presenting a fluid reservoir and a cylinder; a piston in said cylinder, said piston having a port for transferring fluid from one side of the piston to the other; a valve adapted to establish a substantially free flow of fluid through the piston in one direction only; a seat for said valve; a fluid conduit carried by the piston and adapted to by-pass said valve; means adapted to control the flow of fluid through said conduit in accordance with the position of the piston; a disc in the cylinder supporting the said means; and a spring in the cylinder interposed between the disc and valve seat, said spring holding said disc and valve seat in proper positions and operating the piston in one direction.

In testimony whereof I hereto affix my signature.

GEORGE W. ELSEY.